United States Patent [19]
Lüssling et al.

[11] 3,873,595
[45] Mar. 25, 1975

[54] PRODUCTION OF O-PHTHALODINITRILE
[75] Inventors: Theodor Lüssling; Hans Schaefer, both of Grossauheim; Wolfgang Weigert, Offenbach, all of Germany
[73] Assignee: Deutsche Gold- und Silber-Scheideanstalt vormals Roessler, Frankfurt am Main, Germany
[22] Filed: June 21, 1973
[21] Appl. No.: 372,104

Related U.S. Application Data
[62] Division of Ser. No. 74,828, Sept. 23, 1970, abandoned.

[30] Foreign Application Priority Data
Sept. 26, 1969 Germany............................ 1948714

[52] U.S. Cl............................. 260/465 C, 252/461
[51] Int. Cl.................. C07c 121/02, C07c 121/56
[58] Field of Search ................................ 260/465 C

[56] References Cited
UNITED STATES PATENTS
3,475,350  10/1969  Winnick et al. .................... 260/465

FOREIGN PATENTS OR APPLICATIONS
1,290,125  3/1969  Germany
1,034,914  7/1966  United Kingdom
1,070,354  6/1967  United Kingdom Primary Examiner—Lewis Gotts
Assistant Examiner—Dolph H. Torrence
Attorney, Agent, or Firm—Cushman, Darby & Cushman

[57] ABSTRACT
A catalyst useful in preparing o-phthalodinitrile from o-xylene comprises antimony oxide and vanadium oxide and/or antimony vanadate. The antimony oxide is present as β-antimony tetroxide.

11 Claims, No Drawings

PRODUCTION OF O-PHTHALODINITRILE

This is a division of application Ser. No. 74,828 filed Sept. 23, 1970 and now abandoned.

The present invention is directed to a catalyst useful in the reaction of o-xylene with ammonia and oxygen to form o-phthalodinitrile.

Several processes for the production of aromatic nitriles from the corresponding alkyl aromatic compound by the reaction with ammonia and oxygen are known which are characterized by various reaction conditions, especially by different catalysts. For the catalysts there are primarily used elements such as antimony, vanadium, molybdenum, tungsten, chromium and manganese. They are particularly employed as oxides, for the most part in mixtures or, in a given case, in compounds with each other and for the most part are used on carriers based on silica or alumina.

It is particularly known to use as a catalyst compounds of antimony and vanadium and a carrier (German Auslegeschrift No. 1,286,002 and German Auslegeschrift No. 1,290,125).

According to our own experience these processes in the reaction of o-xylene only form o-phthalodinitrile to a small extent but instead form essentially only phthalimide. For another process an equivalent catalyst was used with the addition of alkali oxide (Netherlands application No. 6,810,189). This process makes it possible to obtain o-phthalodinitrile in favorable yield but it requires a large excess of ammonia.

It is also known to employ aluminum oxide with vanadium oxide-chromium oxide mixtures as catalysts, German Auslegeschrift No. 1,172,253. The disadvantages of this process are that the catalyst provided is only producible with difficulty with reproducible results and that its preparation requires great exactness, especially in regard to the selection of an aluminum oxide of suitable quality.

It is also known to use a catalyst produced essentially from compounds of tungsten, in a given use with addition of compounds of various other metals (German Auslegeschrift No. 1,279,012). This process is selective for the conversion of o-xylene to o-phthalodinitrile, however, there are obtained only low space-time-yields.

It has now been found that a catalyst for the reaction of o-xylene with ammonia and oxygen to form o-phthalodinitrile can be made from antimony oxide together with vanadium oxide and/or antimony vanadate, in a given case on a carrier, provided that the antimony oxide is present as β-antimony tetroxide.

The catalyst of the invention differs advantageously from the catalysts used in known processes. It can be prepared in a simple manner with very good reproducibility. It has proven very selective for the conversion of o-xylene to o-phthalodinitrile and permits high space-time-yields. Good yields of o-phthalodinitrile are obtained without the use of a large excess of ammonia.

For the production of the catalyst of the invention there is heated a mixture of antimony oxide (antimony trioxide) with vanadium oxide and/or antimony vanadate for 1 to 50 hours, preferably 2 to 20 hours in the presence of oxygen at temperatures of 720° to 1100°C., preferably 800° to 1000°C., especially preferred being temperatures of 800° to 840°C. The mixtures are so chosen that the atomic ratio of antimony to vanadium lies between 1.1 to 1 and 50 to 1, preferably between 2 to 1 and 25 to 1. After the heating, this mixture contains in addition to antimony vanadate antimony tetroxide in the monoclinic β-modification as can be proven in know-manner by Guiner-X-ray photographs with the help of the ASTM powder file.

However, if the same starting catalyst substance is merely heated to a temperature of 700°C., the antimony tetroxide is present in the ortho rhombic form and β-antimony tetroxide is not detectable.

For the preparation of the antimony-vanadium mixtures one can proceed from antimony oxides and vanadium oxides and/or antimony vanadate or from the elements or any compounds of antimony and vanadium which can be converted into the oxides or antimony vanadate, as for example ammonium salts of vanadic acid or halogen compounds or organic compounds of antimony and vanadium. A preferred method for the preparation of the antimony-vanadium mixture is to treat antimony or antimony trioxide with concentrated nitric acid, separate the hydrated antimony oxide, disperse it in water and mix with ammonium vanadate in the desired proportions and finally evaporate the mixture to dryness. Advantageously the thus prepared antimony-vanadium mixture is first heated to a temperature between 250° and 350°C., especially at about 300°C. for 20 to 60 minutes in the presence of oxygen and then is heated further to 720° to 1100°C.

The catalyst can be used as such or can be used on a carrier and/or mixed with a carrier. As carriers, for example, there can be used silicon carbide or preferably kieselguhr, and especially silica. The catalysts are suitable for use in fixed beds as well as in fluidized beds and accordingly can be employed for example in the form of pellets or in granular form.

The reaction of o-xylene with ammonia and oxygen to form o-phthalodinitrile with the use of the catalyst of the present invention takes place in the usual manner in the gas phase. A wide latitude can be used in the selection of the reaction conditions. The reaction is preferably carried out without the use of extra pressure or with low pressures up to 3 atmospheres and at temperatures between 250° and 600°C., preferably 350° to 550°C. The pressure, however, can vary from 1 to 3 atmospheres. The proportions of o-xylene to ammonia to oxygen can vary within wide boundaries. Stoichiometric amounts can be employed. Expediently, however, ammonia is used in twice to five times the stoichiometric amount in relation to the o-xylene. Oxygen can be used in an amount up to fifty times the stoichiometric amount in relation to the o-xylene depending on the reaction conditions. The gaseous mixture can be diluted with inert gases such as nitrogen, carbon dioxide and/or steam for example. Especially air can be employed instead of pure oxygen. The concentration of the xylene in the gaseous mixture preferably amounts to 0.5 to 10 volume percent. The residence time is dependent upon the remaining reaction conditions. Generally it is between 0.1 and 20, especially between 0.2 and 10 seconds.

In the following examples the terminology has the following mean:

Conversion = moles of converted xylene/moles of added xylene × 100 (%)

Yield = moles of nitrile produced/moles of xylene added × 100 (%)

Space-time-Yield = Amount of nitrile produced/time/bulk volume of the catalyst (grams)/(liters × hours)

Residence time = bulk volume of catalyst/gas volume passed through*/time (seconds)

*Volume based on the conversion temperature

EXAMPLE 1

200 grams of powdered antimony were introduced into 850 ml of 65 percent nitric acid whose temperature was held at 75°C. The mixture was further heated to the boiling point until no more nitrous gases escaped. The precipitate of hydrated antimony oxide formed was separated, washed with water and dispersed in 150 ml of water. There were added 48.1 grams of ammonium metavanadate ($NH_4VO_3$) with stirring, the mixture was evaporated to dryness and heated in an air stream at 300°C. for 30 minutes. The catalyst composition thus prepared in which the antimony and vanadium were present in the atomic ratio of 4 to 1 was molded into tablets.

The tablets were heated in a furnace for 16 hours in an airstream at (a) 500°C., (b) 700°C., and (c) 800°C. in each case inside of about 5 hours cooled in the furnace to 400°C and cooled outside the oven to room temperature and finally in each case pulverized to a particle size of 0.6 to 1.0 mm.

There was poured into a fixed bed reactor of alloy steel, 11 mm internal diameter and 200 mm. long, in each case 15 ml. of these materials. Through the reactor, which was heated to the desired conversion temperature by means of a salt melt, there was led a gas mixture containing 0.5 volume percent o-xylene, 5 volume percent ammonia and 94.5 volume % air. The o-xylene in each case was completely reacted.

|  | (a) | (b) | (c) |
|---|---|---|---|
| catalyst heated to (°C.) | 500 | 700 | 800 |
| temperature of salt melt (°C.) | 330 | 330 | 460 |
| residence-time (seconds) | 2.3 | 2.3 | 1.9 |
| YIELD |  |  |  |
| o-phthalodinitrile (%) | 2.8 | 12 | 51 |
| o-toluonitrile (%) | 9.2 | 31 | 22 |
| phthalimide (%) | 45 | 44 | 4.0 |

The examination of the catalysts by X-ray structure analysis according to the Guinier method with Cu Kα-radiation showed with the aid of the ASTM powderfile that in the materials (a) and (b) heated to 500° and 700°C. respectively, there were present orthorhombic antimony tetroxide and antimony vanadate while in material (c) heated to 800°C. there were present β-antimony tetroxide and antimony vanadate.

EXAMPLE 2

A catalyst was produced in accordance with example 1 (c), however, containing antimony and vanadium in the atomic ratio of 9 to 1, otherwise the process was carried out as in example 1. The temperature of the salt melt, however, was 500°C. and the residence time 1.8 seconds.

The o-xylene was completely reacted. The yield amounted to o-phthalodinitrile 60 percent, o-toluonitrile 10 percent and phthalimid 6.4 percent.

EXAMPLE 3

233.3 grams of antimony trioxide were introduced into 400 ml of 65 percent nitric acid. The mixture was held at the boiling point with stirring for 1 hour. The precipitate was separated off, washed with water and introduced with stirring into 4.5 liters of water that contained 46.8 grams of dissolved ammonium metavanadate. Finally there was added with stirring 188.3 grams of highly dispersed silica. The pH was brought to 3 with nitric acid. The mixture was held at the boiling point for an hour with stirring and then dried on a drum drier. The catalyst composition thus prepared which contained antimony and vanadium in the atomic ratio of 4 to 1 was heated for 25 minutes in an air stream at 250°C., after cooling and addition of 3 percent graphite tabletteded and finally treated for 2 hours in an air stream at 800°C.

It was further processed as in example 1. The temperature of the salt melt was 460°C., the residence time 1.9 seconds. The o-xylene conversion was 100 percent, the yields were o-phthaladinitrile 71 percent, a toluonitrile 8.4 percent and phthalimide 4.0%.

EXAMPLE 4

There were used 15 ml of the catalyst produced in example 3 and there was passed over the catalyst in the reactor described in example 1 at a residence time reduced to 0.91 seconds a gas mixture of 1 volume percent o-xylene, 10 volume % ammonia and 89 volume percent air. The temperature of the salt melt was 495°C. The o-xylene conversion was 100 percent, the space-time-yield of o-phthalodinitrile 57 grams/l × h. The yields were o-phthalodinitrile 69% toluonitrile 6.6 percent and phthalimide 4.6 percent.

In the examples the atomic ratio of antimony to vanadium range from a low of 4 to 1 in Example 1 to a high of 9 to 1 in Example 2.

What is claimed is:

1. A process for the production of o-phthalodinitirle from a mixture comprising o-xylene, ammonia and oxygen comprising heating said mixture in gaseous form in contact with a catalyst mixture containing β-antimony tetroxide and a member selected from the group consisting of vanadium oxide, antimony vanadate and mixtures thereof wherein the antimony and vanadium are present in the atomic ratios of from 1.1 to 1 up to 50 to 1.

2. A process according to claim 1 wherein the catalyst is mixed with a silica carrier.

3. A process according to claim 1 wherein the antimony and vanadium are present in the atomic ratios of from 4 to 1 up to 9 to 1.

4. A process according to claim 1 wherein the reaction is carried out at a pressure up to 3 atmospheres at a temperature of 250° to 600°C.

5. A process according to claim 4 wherein the amount of ammonia is 2 to 5 times the stoichiometric amount in relation to the o-xylene and the oxygen is used in an amount up to fifty times the stoichiometric amount in relation to the o-xylene.

6. A process according to claim 5 wherein the concentration of the xylene in the gaseous mixture is 0.5 to 10 volume percent.

7. A process according to claim 6 wherein the gaseous mixture includes an inert diluent.

8. A process according to claim 7 wherein the oxygen is present in the form of air.

9. A process according to claim 1 wherein there is included an inert gas in the gaseous mixture and the heating is carried out at 250° to 600°C.

10. A process according to claim 1 wherein the antimony and vanadium are present in the catalyst in the atomic ratio from 2 to 1 up to 25 to 1.

11. A process according to claim 1 wherein the catalyst is prepared by heating a mixture of antimony trioxide with a member selected from the group consisting of vanadium oxide, antimony vanadate and mixtures thereof for 1 to 50 hours at 720° to 1100°C.

* * * * *